US008353975B2

(12) United States Patent
Brück et al.

(10) Patent No.: US 8,353,975 B2
(45) Date of Patent: *Jan. 15, 2013

(54) PROCESS FOR PRODUCING A FLEECE HAVING METALLIC WIRE FILAMENTS, PROCESS FOR PRODUCING HONEYCOMB BODY HAVING AT LEAST ONE FLEECE, FLEECE, HONEYCOMB BODY, APPARATUS AND VEHICLE

(75) Inventors: Rolf Brück, Bergisch Gladbach (DE); Peter Hirth, Rösrath (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 1444 days.

This patent is subject to a terminal disclaimer.

(21) Appl. No.: 11/942,380

(22) Filed: Nov. 19, 2007

(65) Prior Publication Data
US 2008/0087489 A1    Apr. 17, 2008

Related U.S. Application Data

(63) Continuation of application No. PCT/EP2006/004483, filed on May 12, 2006.

(30) Foreign Application Priority Data

May 17, 2005   (DE) .......................... 10 2005 023 385

(51) Int. Cl.
*B01D 46/00*   (2006.01)
(52) U.S. Cl. ............. 55/385.3; 55/486; 55/523; 55/525; 55/527; 55/DIG. 5; 55/DIG. 30; 428/566; 428/593; 428/613; 442/52; 228/157; 228/181; 228/187; 219/78.11

(58) Field of Classification Search ................. 55/385.3, 55/252, 282.3, 283, 477, DIG. 30, 282; 95/278; 228/157, 260; 428/593, 544, 594; 422/171, 422/180; 210/347
See application file for complete search history.

(56) References Cited

U.S. PATENT DOCUMENTS

| | | | | | |
|---|---|---|---|---|---|
| 3,504,422 | A | * | 4/1970 | Thalman | 29/419.1 |
| 3,780,872 | A | * | 12/1973 | Pall | 210/493.1 |
| 4,037,751 | A | * | 7/1977 | Miller et al. | 428/593 |
| 4,122,015 | A | * | 10/1978 | Oda et al. | 210/496 |
| 4,588,537 | A | * | 5/1986 | Klaase et al. | 264/436 |
| 4,687,579 | A | * | 8/1987 | Bergman | 210/347 |
| 5,505,757 | A | * | 4/1996 | Ishii | 55/523 |
| 5,873,918 | A | | 2/1999 | Dillman et al. | |

(Continued)

FOREIGN PATENT DOCUMENTS

| | | |
|---|---|---|
| EP | 0 411 421 A1 | 2/1991 |
| GB | 804354 | 11/1958 |

(Continued)

*Primary Examiner* — Duane Smith
*Assistant Examiner* — Karla Hawkins
(74) *Attorney, Agent, or Firm* — Laurence A. Greenberg; Werner H. Stemer; Ralph E. Locher

(57) ABSTRACT

A process for producing a fleece having metallic wire filaments, includes at least the following steps:
a) forming a layer including wire filaments;
b) producing first cohesive connections between at least some of the metallic wire filaments in a first joining process; and
c) producing second cohesive connections between metallic wire filaments in a second joining process. A process for producing a honeycomb body having at least one fleece, a fleece, a honeycomb body, an apparatus and a vehicle using fleeces in the treatment of exhaust gas from motor vehicles, are also provided.

13 Claims, 3 Drawing Sheets

U.S. PATENT DOCUMENTS

| | | |
|---|---|---|
| 6,329,625 B1 | 12/2001 | Quick et al. |
| 6,585,151 B1 * | 7/2003 | Ghosh .......................... 228/260 |
| 7,833,319 B2 * | 11/2010 | Bruck et al. ................... 95/273 |
| 2002/0100167 A1 | 8/2002 | Hardesty et al. |
| 2003/0086837 A1 * | 5/2003 | Bruck et al. ................. 422/180 |
| 2004/0194440 A1 * | 10/2004 | Bruck et al. ................... 55/487 |

FOREIGN PATENT DOCUMENTS

| | | |
|---|---|---|
| GB | 948529 | 2/1964 |
| GB | 1452982 | 10/1976 |
| JP | 5-200304 | 8/1993 |
| JP | 05200304 | 8/1993 |

* cited by examiner

PROCESS FOR PRODUCING A FLEECE HAVING METALLIC WIRE FILAMENTS, PROCESS FOR PRODUCING HONEYCOMB BODY HAVING AT LEAST ONE FLEECE, FLEECE, HONEYCOMB BODY, APPARATUS AND VEHICLE

CROSS-REFERENCE TO RELATED APPLICATIONS

This is a continuation, under 35 U.S.C. §120, of copending international application No. PCT/EP2006/004483, filed May 12, 2006, which designated the United States; this application also claims the priority, under 35 U.S.C. §119, of German patent application No. DE 10 2005 023 385.6, filed May 17, 2005; the prior applications are herewith incorporated by reference in their entirety.

BACKGROUND OF THE INVENTION

Field of the Invention

The present invention relates to a process for producing a fleece having metallic wire filaments, and to a process for producing a honeycomb body having at least one fleece. The invention also relates to a fleece having a multiplicity of metallic wire filaments, a honeycomb body formed therewith, an apparatus for exhaust-gas treatment and a vehicle having the apparatus.

Metallic fiber fleeces or mats are used, for example, as filter material for exhaust gases from stationary and mobile internal combustion engines. They are used in particular to retain particulates (ash, soot, etc.) contained in the exhaust gas. The particulates are at least partially retained by the fiber fleece and chemically converted, if appropriate, using a catalyst. Due to the high thermal and dynamic stresses on the fiber fleeces, in particular in exhaust systems of mobile internal combustion engines, for example, of land vehicles, air vehicles and boats, etc., particular demands are imposed on such a fiber fleece with regard to their long-term strength. In particular, permanent connection of the fibers to one another is necessary.

Such fiber fleeces are produced, for example, by welding or are produced by forming sintered connections between the wire filaments.

When producing the fleeces, it is necessary to take into account the fact that under certain circumstances they also need to be joined to further components in order to ultimately form an exhaust-gas treatment device. For that purpose, it is necessary on occasion for a specific shape to be imparted to the fiber fleece. However, the desired shaping is impeded by the connections which have been formed between the fibers, and consequently considerable difficulties have arisen in series production with a view toward manufacture of exhaust-gas treatment units of that type. For example, additional handling tools with a special configuration are required, and due to the poor formability of the smooth fiber fleeces, those tools are also subject to considerable wear. Moreover, there is a risk of the fiber fleece tearing uncontrollably at various locations, in which case, under certain circumstances, it is possible for fibers to subsequently become detached in the exhaust system.

SUMMARY OF THE INVENTION

It is accordingly an object of the invention to provide a process for producing a fleece having metallic wire filaments, a process for producing a honeycomb body having at least one fleece, a fleece, a honeycomb body, an apparatus and a vehicle, which overcome the hereinafore-mentioned disadvantages of the heretofore-known processes and products of this general type and which at least partially alleviate the technical problems which have been outlined in connection with the prior art. In particular, it is an object to provide a process for producing a metallic fleece which allows simple series production even of exhaust-gas treatment units. Furthermore, it is intended to provide a process for producing a honeycomb body which involves using a metallic fleece that can be subjected to accurate shaping even for series production. Finally, it is also intended to propose a fleece which makes it easy to produce honeycomb bodies and apparatuses for exhaust-gas treatment.

With the foregoing and other objects in view there is provided, in accordance with the invention, a process for producing a fleece having metallic wire filaments. The process comprises:

a) forming a layer with the metallic wire filaments;
b) producing first cohesive connections between at least some of the metallic wire filaments in a first joining process; and
c) producing second cohesive connections between metallic wire filaments in a second joining process.

A "fleece" is to be understood in particular as meaning a sheet-like structure in which the wire filaments that form the fleece can be disposed in ordered fashion or randomly with respect to one another. Examples of a fleece include woven fabrics, grid structures, knitted fabrics, irregular layers, etc. The fleece may, in principle, also include at least one filler, such as for example other types of fleeces, powders or the like, with the latter ultimately being captively connected to the fleece. The fleece is formed by wire filaments which include a corrosion-resistant material that is able to withstand high temperatures. The "wire filament" is a term used to signify in particular an element of elongate length and in particular also encompasses elements in wire form, elements in chip form and similar elements. The metallic wire filaments in particular include a material which substantially includes steel as base material, preferably with high chromium contents (e.g. in a range of from 18 to 21% by weight) and/or aluminum contents (e.g. at least 4.5% by weight, in particular at least 5.5% by weight). In principle, aluminized wire filaments can also be used. These metallic wire filaments are preferably constructed with a filament length in a range of from 0.1 to 50 mm (in particular in a range of from 1 to 10 mm) and a filament diameter in a range of from 0.01 to 0.1 mm (in particular in a range of from 0.02 to 0.05 mm). The weight per unit area of a fleece of this type is preferably in a range of from 750 to 1,500 g/m². The porosity of the fleece that is to be produced is preferably in a range of from 30% to 80%, in particular in a range of from 45% to 60%.

According to step a), first of all a layer including wire filaments is formed. This is to be understood as meaning in particular that the wire filaments are disposed in a loose assembly against and/or on top of one another. For this purpose, the wire filaments (random or oriented) are placed, for example, on a support, so that the wire filaments are in contact with one another. The layer is formed until a desired layer thickness, a specified layer weight and/or a desired porosity is present. The layer therefore represents the starting component for the fleece, without any cohesive connections yet being present between the wire filaments.

In step b), first cohesive connections are produced between at least some of the metallic wire filaments using a first joining process. The first cohesive connections are constructed in such a way that the fleece can still be readily shaped, in particular can still be wound helically, wound in an S shape or deformed in a similar way. It is preferable for the majority of the metallic wire filaments, preferably at least 80% of the wire filaments, to have already been connected to one another by the first joining process. Furthermore, it is preferable for at least some of the metallic wire filaments to have a plurality of first cohesive connections to adjacent wire filaments, which should be the case in particular for at least 40% of the wire filaments. It is very particularly preferable for step b) to be executed such that cohesive connections with regard to a metallic wire filament are formed only in a subregion of the wire filament which is significantly smaller than the filament length. By way of example, these first cohesive connections are formed only in a subregion amounting to less than 20% (in particular less than 5%) of the filament length.

With this type of configuration of the first cohesive connections, there is only a relatively small or reduced number of cohesive connections or connection points stiffening the fleece, so that on one hand it is ensured that the fleece is transportable and even also deformable, but on the other hand the risk of insufficient anchoring or fixing of a significant proportion of the wire filaments is avoided. The first joining process is preferably a joining process selected from the group consisting of manufacturing processes relating to joining by welding and joining by brazing. In principle, it is possible to work with or without filler.

Then, in a further step c), second cohesive connections are produced between the metallic wire filaments using a second joining process. In other words, this means in particular that the formation of the first and second cohesive connections takes place locally and temporally separately. During the second joining process, additional second cohesive connections or connection points are generated, which lead to further stiffening of the fleece. In particular, a first flexural strength after step b) (maximum force occurring during bending of the fleece (width: 50 mm) up to a bending angle of 90° with a free bending length of 20 mm) is considerably lower than a second flexural strength after step c) has been carried out. The second flexural strength preferably is at least 50%, in particular 100%, greater than the first flexural strength. Since the absolute flexural strength value is dependent on the specific configuration of the fleece, it is possible in this case, purely by way of example (0.3 mm fleece thickness, 0.022 mm filament diameter, 85% porosity), to specify a value for the flexural strength. The first flexural strength in this case is in a range of from 600 to 1,200 mN and preferably below 1,000 mN, whereas after step c) by way of example, a second flexural strength of at least 1,500 nm is produced. After step c), it is preferable for at least 90% of all of the wire filaments to have at least one first and/or at least one second cohesive connection.

The process proposed herein proposes a two-stage generation of the desired fleece property in terms of its structural integrity. This opens up the possibility of the fleece first of all being brought into a readily shapeable state, then being deformed into its final shape and finally acquiring its ultimately desired rigidity in a subsequent joining process. This allows, for example, the production of structured fleeces which are ultimately able to withstand the high dynamic and thermal stresses in the exhaust system of mobile internal combustion engines for a prolonged period of time.

In accordance with another mode of the invention, a welding process is used as the first joining process to carry out step b). It is very particularly preferable for resistance welding processes to be used to form the first cohesive connections. In this context, what is known as roller seam welding, in which at least two roller-like electrodes are disposed on either side of the fleece, has proven particularly suitable. Applying a voltage to the electrodes and bringing them into contact with the wire filament layer leads to the formation of cohesive connections between the metallic wire filaments. Due to the spatially delimited zone of action of the welding process, first cohesive connections are also generated only in relatively locally limited subregions of the layer or fleece. This allows the desired fleece property to be set in a targeted fashion for further treatment of the fleece.

In accordance with a further mode of the invention, a high-temperature treatment of the fleece to form sintered connections is used as the second joining process to carry out step c). In this case, it is very particularly preferable for the fleece to be exposed to a temperature of over 800° C., in particular over 1,100° C. In this case, the environment surrounding the fleece can be realized with a vacuum and/or a shielding gas atmosphere. The second cohesive connections are in particular distinguished by what are known as sinter necks, which form as a result of surface diffusion between the metallic wire filaments. The second cohesive connections are usually positioned in the region of contact between adjacently fixed wire filaments.

In accordance with an added mode of the invention, step b) includes forming a connection plan, so that at least one anisotropic fleece property is produced. An "anisotropic" configuration of a property is to be understood in particular as meaning that the extent of this property differs significantly as seen in different directions of the fleece. This means, for example, that the fleece after step b) is flexurally rigid in one direction and flexurally yielding in another direction. In order to achieve this, it is proposed that a connection plan be formed. A "connection plan" is to be understood as meaning a predetermined configuration of zones of first cohesive connections. This connection plan may include a plurality of zones of first cohesive connections disposed in a defined way with respect to one another such that they form a type of pattern. The connection plan can be formed with a plurality of zones, at least some of which are parallel to one another and/or at least some of which cross one another. The specific configuration of the connection plan is dependent mainly on the type of deformation of the fleece which is still desired. The different configuration of the connection plan allows in particular the following fleece properties to be made anisotropic: flexural strength, strength, cold-formability, tensile strength.

In accordance with an additional mode of the invention, at least one of the following steps is carried out between step b) and step c):
  transporting the fleece,
  deforming the fleece,
  coating the fleece.

During transporting of the fleece, the fleece is, for example, removed from a support or moved together with the support to a different location. In this context, it is also possible for the fleece to be at least partially elastically deformed, rotated, etc. The deformation of the fleece includes, for example, the introduction of openings, winding of the fleece, twisting and/or structuring of the fleece. During the deformation of the fleece, it is preferable to effect a permanent, plastic deformation of the sheet-like structure to form a more complex structure, for example in the manner of a spiral, a cylinder, a corrugated or zigzag shape, etc. The coating of the fleece may include the application of a filler, with this filler being temporarily or permanently fixed to the fleece. A temporary coating could, for example, include attaching an adhesive for fixing further components or a powder (brazing material, filter material, etc.). One example of a permanent coating is the application of any additional material including at least one alloying element which is at least partially introduced into the surface of the fleece, if appropriate at the same time as step c) is being carried out.

With the objects of the invention in view, there is also provided a process for producing a honeycomb body having at least one fleece with a multiplicity of metallic wire filaments. The process comprises:

w) forming a layer of the metallic wire filaments;
x) producing first cohesive connections between at least some of the metallic wire filaments in a first joining process;
y) configuring the at least one fleece to form a honeycomb body; and
z) producing second cohesive connections between metallic wire filaments in a second joining process.

A honeycomb body is distinguished, in particular, by the fact that it is constructed with a multiplicity of passages, which are usually disposed substantially parallel to one another and through at least some of which a fluid can flow. Honeycomb bodies of this type are used, for example, to remove pollutants from exhaust gases from mobile internal combustion engines. The honeycomb bodies serve, for example, as carriers for a catalytically active coating and/or as a particulate trap. At least one fleece including a multiplicity of metallic wire filaments is provided in this case for building up the honeycomb structure. Reference should be made to the explanations given above in connection with steps a) and b) for details as to the production of the wire filament fleece (steps w) and x)).

After the first cohesive connections have been produced, according to step y), the process step of configuring at least one fleece so as to form a honeycomb body takes place. This configuring step includes, for example, deforming the fleece, aligning the fleece with respect to further components of the honeycomb body (such as, for example, additional sheet-metal foils), integrating the fleece in a housing, and the like. It is preferable for step y) to be carried out in such a way that the desired configuration of the honeycomb body having the at least one fleece is present, and finally in step z) the desired long-term strength or rigidity of the fleece or honeycomb body is realized.

In accordance with another mode of the invention, step y) encompasses the assembly of the at least one fleece with other metallic components, and also forming cohesive connections between at least some of the components during step z). Further metallic components, which may form part of a honeycomb body, include, for example, a metallic housing, at least one metal foil (which likewise at least partially delimits passages) and metallic connection elements which, for example, allow a plurality of fleeces to be connected to one another and/or close off at least some of the passages in the honeycomb body. In connection with step y), the intention is in particular the alternate stacking of a smooth fleece and a corrugated metal foil, which are then wound and/or intertwined to form a honeycomb body. This assembly made up of metal foil and fleece is then inserted into a housing, which takes place with a prestress which is such that the assembly made up of fleece and metal foil is temporarily fixed. In this configuration of the components with respect to one another, second cohesive connections are then formed during step z).

In accordance with a further mode of the invention, step z) includes a soldering process (specifically what is known as "brazing") carried out at temperatures above 800° C. and under vacuum. In this context it is advantageous for at least subregions of the components to be provided with a brazing material, which then forms further cohesive connections between at least some of the components. Therefore, during step z), on one hand the fleece is stiffened by the formation of second cohesive connections between the wire filaments, and at the same time a connection is produced between the components. The brazing process described herein preferably takes place at temperatures above 1,000° C. This process step also improves the quality or strength of the connections.

With the objects of the invention in view, there is furthermore provided a fleece. The fleece comprises a multiplicity of metallic wire filaments. Some of the metallic wire filaments are cohesively connected to one another according to a connection plan, providing the fleece with at least one anisotropic fleece property.

Reference is made to the explanations given above with regard to the anisotropy. The at least one fleece property includes at least one of the following properties of the fleece: flexural strength, strength, cold-formability, tensile strength.

In accordance with another feature of the invention, the starting point in this case is in particular that the wire filaments are disposed randomly with respect to one another. In principle it is possible for the fleece to also be formed by using oriented or ordered wire filaments, so that, for example, the configuration of these filaments already produces an anisotropy. Nevertheless, the preferred option in this case is a fleece in which the wire filaments are disposed randomly with respect to one another and the anisotropy has been produced by specially formed first cohesive connections. Accordingly, the fleece can be produced in particular by the above process which has been described in accordance with the invention.

With the objects of the invention in view, there is additionally provided a honeycomb body. The honeycomb body comprises a fleece according to the invention having a plurality of passages at least partially formed by the fleece, and optionally wherein the metallic wire filaments are disposed randomly with respect to one another.

In this context, a single fleece is preferably used to delimit a plurality of passages, and in the case of a helical structure of the honeycomb body it is even possible for a single fleece to partially delimit all the passages at least in part.

With the objects of the invention in view, there is furthermore provided an apparatus for exhaust-gas treatment, comprising at least one fleece according to the invention, or at least one fleece produced by one of the processes according to the invention, or at least one honeycomb body according to the invention.

The exhaust gas to be purified at least partially flows through this apparatus, with solid particulates at least in part accumulating in or on the fleece. This apparatus is preferably constructed as a filter or particulate trap.

With the objects of the invention in view, there is concomitantly provided a vehicle. The vehicle comprises an internal combustion engine and at least one apparatus according to the invention connected to the internal combustion engine.

The vehicle is preferably a truck or passenger car, in which case the apparatus is integrated in the exhaust system of the vehicle. The internal combustion engine is, for example, a spark-ignition engine or a diesel engine.

Other features which are considered as characteristic for the invention are set forth in the appended claims, noting that the features listed individually in the claims can be combined with one another in any technologically appropriate way so as to form further configurations of the invention.

Although the invention is illustrated and described herein as embodied in a process for producing a fleece having metallic wire filaments, a process for producing a honeycomb body having at least one fleece, a fleece, a honeycomb body, an apparatus and a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
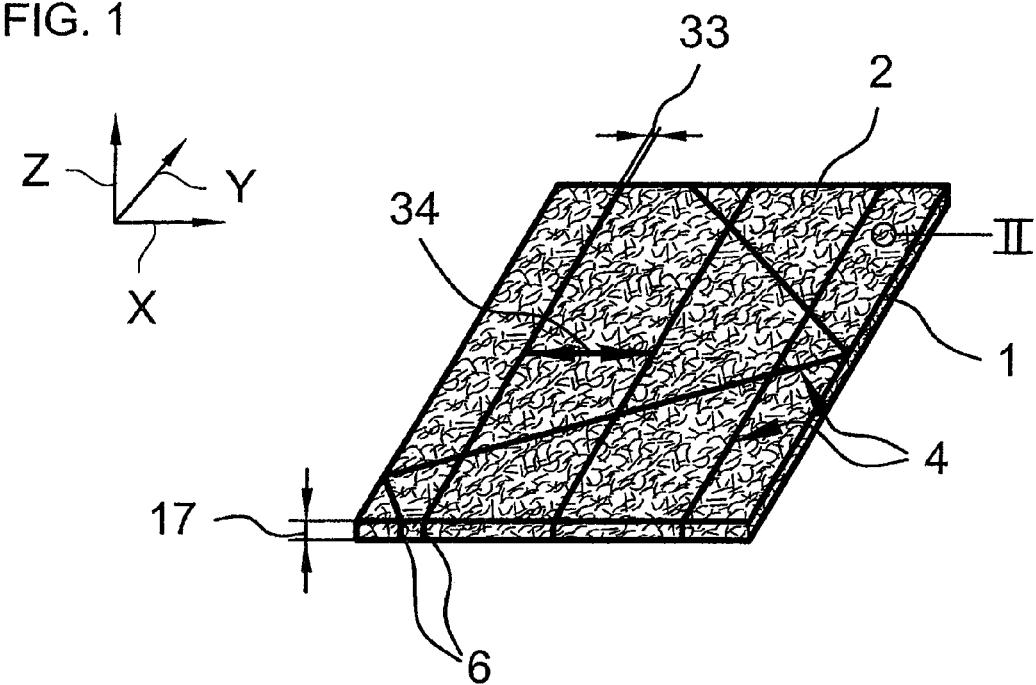
FIG. 1 is a diagrammatic, perspective view of a first variant embodiment of a fleece.

Referring now in detail to the figures of the drawings, which show particularly preferred exemplary embodiments of the invention without restricting the invention thereto and which are diagrammatic in form and in general cannot serve to illustrate size ratios, and first, particularly, to FIG. 1 thereof, there is seen a diagrammatic and perspective illustration of a fleece 1 which is formed by a multiplicity of metallic wire filaments 2. The fleece or mat 1 has first cohesive or material connections 4, which together form a connection plan 6. In the illustrated variant embodiment, some of the first cohesive connections 4 are formed as a parallel line, in particular a weld seam, and that connection plan 6 is crossed by a "zigzag"-like configuration of a further first cohesive connection 4. If the fleece is considered in a state in which second cohesive or material connections 5 (shown in FIG. 2) have not yet been generated, the fleece 1 has anisotropic fleece properties. The anisotropy is configured to be different, in particular in a direction of a fleece thickness 17 (z direction) or in its plane (x direction and y direction). It is very particularly preferable for an anisotropy to be formed with regard to the x and y directions, so that the fleece 1 is, for example, flexurally yielding in the x direction and flexurally rigid in the y direction. The illustrated weld seams may have a width of up to 100 mm, in which case the distance between adjacent weld seams may be selected to be smaller than the width of the weld seams. The term weld seam is used to describe a zone with a high number of cohesive connections, in particular as compared to the layer or fleece before and after a welding operation.

Figure 2:
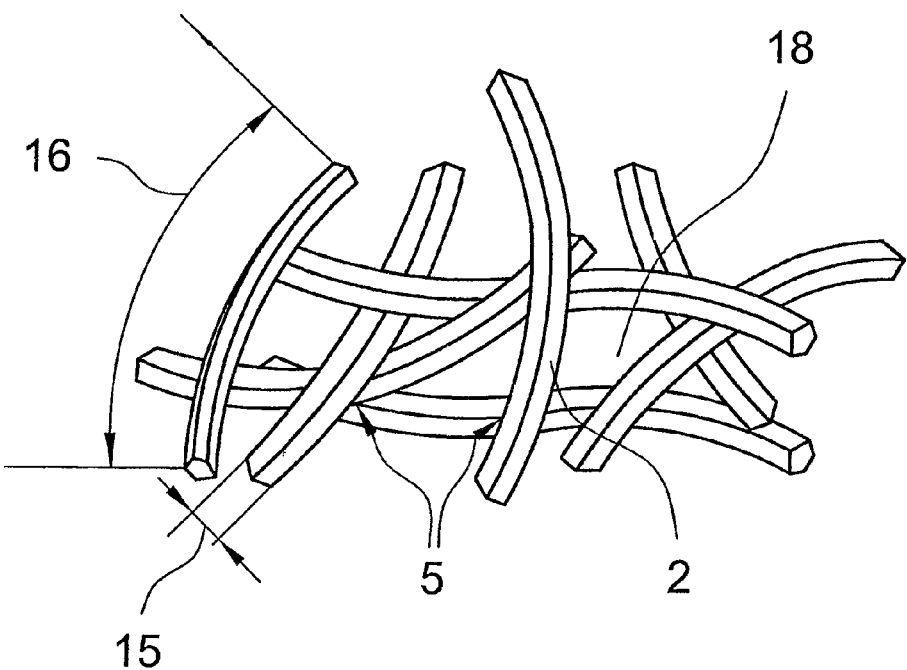
FIG. 2 is an enlarged, fragmentary view of the fleece of FIG. 1.

FIG. 2 shows a portion of the fleece of FIG. 1 at a time when the second cohesive connections 5 have been formed. The second cohesive connections 5 are preferably formed as sintered connections which are produced in contact regions of the wire filaments 2. The wire filaments 2 advantageously have a filament length 16 in a range of from 1 to 10 mm and a filament diameter 15 in a range of from 0.02 to 0.05 mm. Due to the random configuration of the wire filaments 2 with respect to one another, pores 18 are formed, allowing the fleece 1 to be gas-permeable. The porosity of the fleece is in a range, for example, of from 45% to 60%. After the first cohesive connections 4 and the second cohesive connections 5 have been formed, the anisotropy which was previously present is greatly reduced or is no longer significant. In this context, it should be fundamentally pointed out that the fleece properties relate to the actual fleece and not to its assembly with further components which may influence rigidity.

Figure 3:
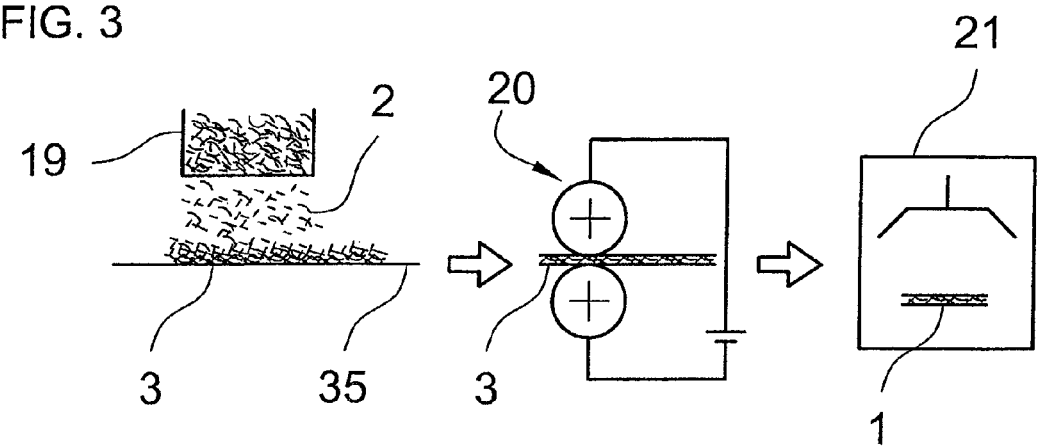
FIG. 3 is a side-elevational view showing a sequence of a first fleece production variant.

FIG. 3 illustrates a variant embodiment of the process for producing a fleece 1. Wire filaments 2 are placed, through the use of a distributor 19, onto a support 35 (which is constructed as a conveyor belt, if appropriate), so as to form a layer 3 including wire filaments 2. When the desired composition of the layer 3 is present, this loose assembly of wire filaments 2 is provided, in a further step, with first cohesive connections through the use of a first joining process, so as to produce the fleece 1. In the illustrated variant embodiment, the joining process is carried out through the use of a welding installation 20. The diagrammatic illustration shows a roller seam welding process (resistance welding). After the fleece 1 having anisotropic fleece properties has been formed, it is possible to carry out various further process steps for producing, for example, a honeycomb body, before the second cohesive connections 5 are finally produced in a further process step (illustrated on the right-hand side of FIG. 3). In the illustration, this is done through the use of a furnace 21 in which, for example, temperatures of over 1,000° C. are present, with sintered connections being formed between the wire filaments 2.

Figure 4:
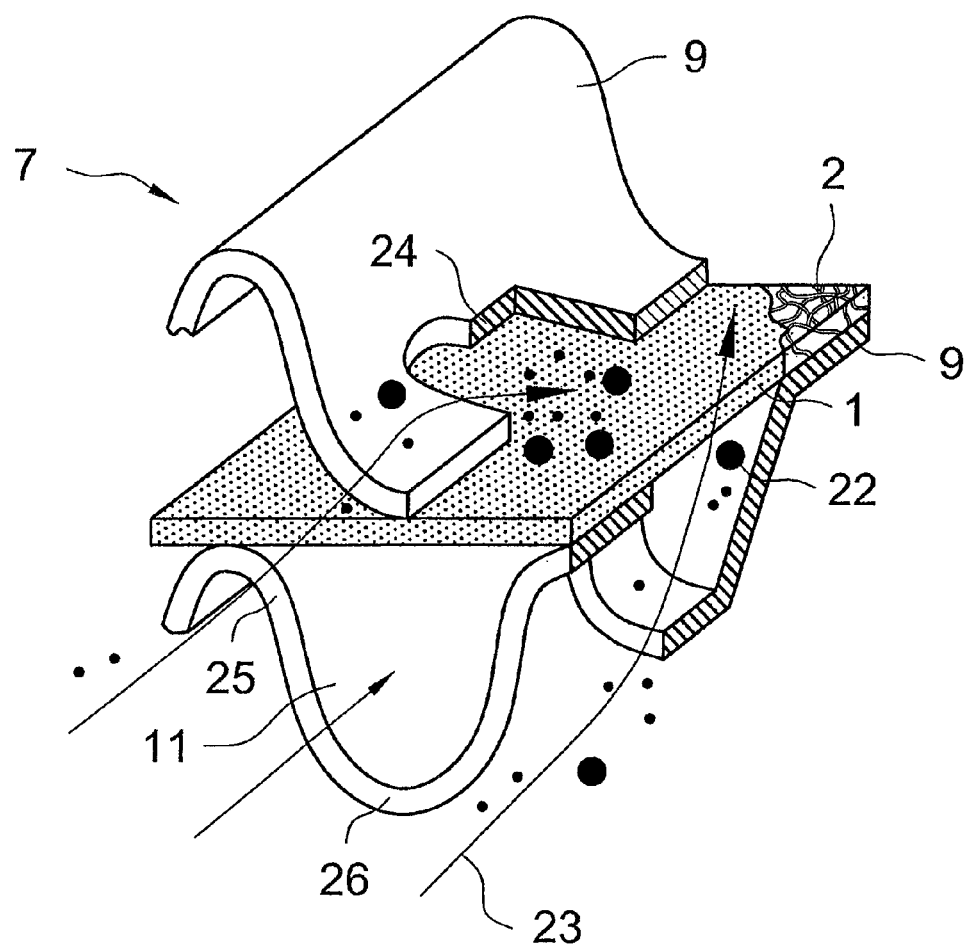
FIG. 4 is a fragmentary, perspective and sectional view showing a honeycomb body with a fleece.

FIG. 4 illustrates a variant embodiment of a honeycomb body 7 having a fleece 1. The honeycomb body 7 has a multiplicity of passages 11 through which an exhaust gas can flow in a flow direction 23. The passages 11 are delimited on one hand by the fleece 1 and on the other hand by metal foils 9. The metal foils 9 are in structured form with corrugation peaks 25 and corrugation valleys 26. Flow-influencing devices 24, which project into inner regions of the passages 11, are provided for the purpose of influencing the flow direction 23 of the exhaust gas and/or of particulates 22 contained therein. Therefore, some of the exhaust gas is diverted toward the fleece 1, with the particulates 22 accumulating at the wire filaments 2 of the fleece 1.

Figure 5:
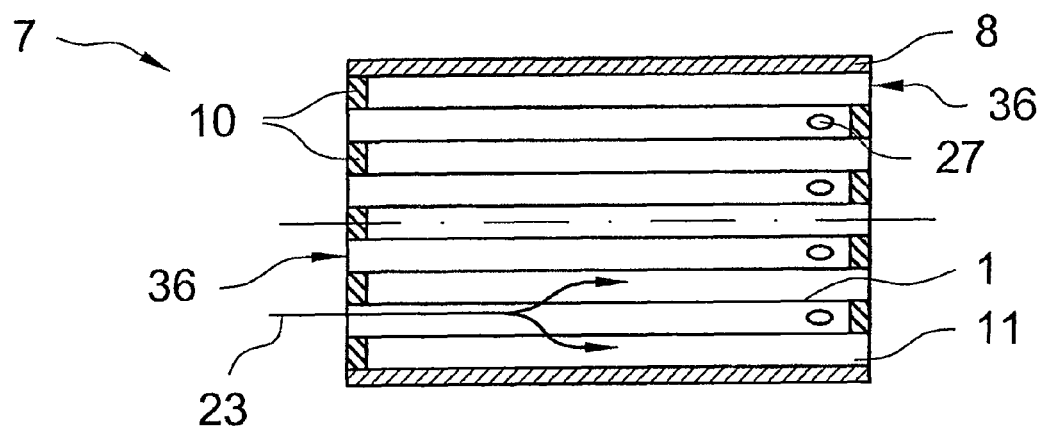
FIG. 5 is a sectional view of a further variant embodiment of a honeycomb body with a fleece.

A further configuration of a honeycomb body 7 as what is known as a "wall-flow filter" is illustrated in FIG. 5. This honeycomb body 7 likewise has a plurality of passages 11 which are closed on alternate sides. The passages 11 in turn are at least partially formed by a fleece 1. It is possible for exhaust gas to enter inner regions of the honeycomb body 7 in a flow direction 23. This exhaust gas, as a result of the positioning of connection elements 10 at end sides 36, is forced to penetrate fully through the fleece 1. In order to prevent blockages, it is possible to provide openings 27 in the fleece 1, constituting a type of bypass, if the fleeces 1, due to a high level of accumulated particulates, form an excessively high flow resistance to the exhaust gas. This honeycomb body 7 is disposed in a metallic housing 8 and is preferably brazed thereto.

Figure 6:
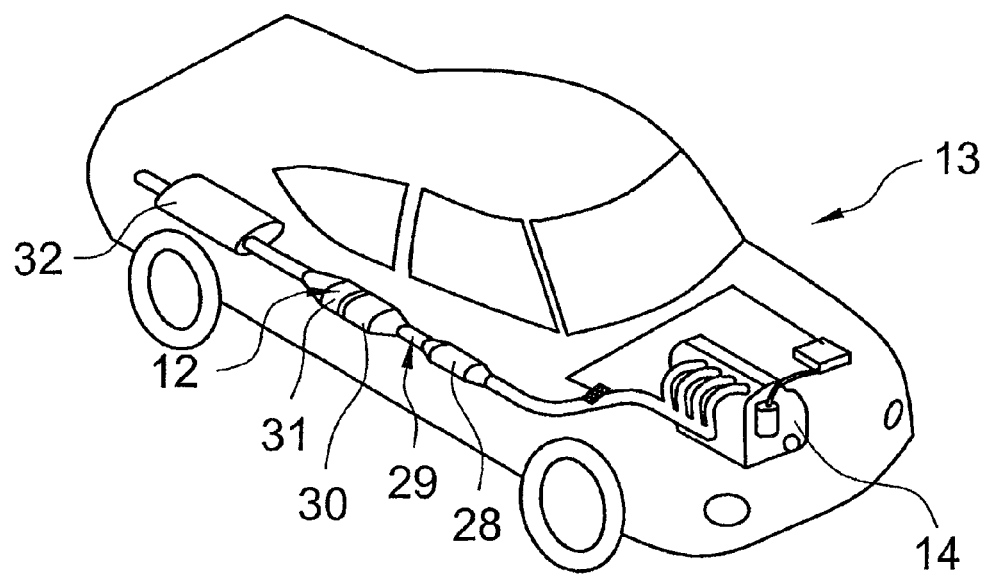
FIG. 6 is a perspective view of a vehicle with an exhaust-gas treatment apparatus.

Finally, FIG. 6 illustrates a preferred intended use of the fleece 1 or the honeycomb body 7. This figure illustrates a motor vehicle 13 having an internal combustion engine 14. The internal combustion engine 14 generates an exhaust gas which is at least partially purified through the use of an illustrated exhaust system 29. For this purpose, the exhaust gas first of all flows through a primary catalytic converter 28. It then flows through an oxidation catalytic converter 30 and an apparatus 12 for exhaust-gas treatment, which is constructed in this case as a particulate trap 31. The combination of an oxidation catalytic converter 30 and a particulate trap 31, by virtue of the provision of nitrogen oxides, allows continuous regeneration of the particulate trap 31, so that if appropriate it is possible to dispense with thermal regeneration, i.e. burning off of soot constituents. The exhaust gas then also flows to a muffler 32 before leaving the exhaust system 29.

The invention claimed is:

1. A process for producing a fleece having metallic wire filaments, the process comprising the following steps:
 a) forming a layer with the metallic wire filaments by disposing the wire filaments in loose contact with one another, the layer being a starting component for the fleece;
 b) producing, in the starting component, first cohesive connections between at least some of the metallic wire filaments in a first joining process; and
 c) producing, in the starting component, second cohesive connections between metallic wire filaments in a second joining process; and
 carrying out step b) by using a welding process as the first joining process and carrying out step c) by using a high-temperature treatment of the fleece to form sintered connections as the second joining process.

2. The process according to claim 1, which further comprises carrying out step b) by using a welding process as the first joining process.

3. The process according to claim 1, which further comprises carrying out step c) by using a high-temperature treatment of the fleece to form sintered connections as the second joining process.

4. The process according to claim 1, which further comprises carrying out step b) by forming a connection plan to produce at least one anisotropic fleece property.

5. The process according to claim 1, which further comprises carrying out at least one of the following steps between step b) and step c):
 transporting the fleece;
 deforming the fleece;
 coating the fleece.

6. The process according to claim 1, wherein between steps b) and c) the fleece is configured in an additional step to define at least a part of the honeycomb body.

7. The process according to claim 6, which further comprises carrying out the additional step by assembling the at least one fleece with other metallic components, and forming cohesive connections between at least some of the components during step c.

8. The process according to claim 6, which further comprises carrying out step c) as a brazing process performed at temperatures above 800° C. and under vacuum.

9. The process according to claim 1, which further comprises applying voltage to the wire filament by contacting the layer with opposing roller-shaped electrodes.

10. A fleece produced by a process according to claim 1, wherein some of the metallic wire filaments are cohesively connected to one another according to a connection plan, to provide the fleece with at least one anisotropic fleece property.

11. The fleece according to claim 10, wherein the metallic wire filaments are disposed randomly with respect to one another.

12. A fleece in a honeycomb body produced according to the method of claim 1, for defining a plurality of passages in the honeycomb body.

13. The fleece according to claim 12, wherein the metallic wire filaments are disposed randomly with respect to one another.

* * * * *